United States Patent
Gao (10) Patent No.: US 9,666,882 B2
(45) Date of Patent: May 30, 2017

(54) SPLICED BIPOLAR PLATES FOR FUEL CELLS AND FUEL CELL STACKS COMPRISING THE SAME

(71) Applicant: Yong Gao, Burnaby (CA)

(72) Inventor: Yong Gao, Burnaby (CA)

( * ) Notice: Subject to any disclaimer, the term of this patent is extended or adjusted under 35 U.S.C. 154(b) by 624 days.

(21) Appl. No.: 13/904,823

(22) Filed: May 29, 2013

(65) Prior Publication Data
US 2014/0356747 A1 Dec. 4, 2014

(51) Int. Cl.
| | |
|---|---|
| H01M 8/0258 | (2016.01) |
| H01M 8/04007 | (2016.01) |
| H01M 8/10 | (2016.01) |
| H01M 8/244 | (2016.01) |
| H01M 8/0267 | (2016.01) |
| H01M 8/0297 | (2016.01) |
| H01M 8/04082 | (2016.01) |
| H01M 8/1018 | (2016.01) |

(52) U.S. Cl.
CPC ....... *H01M 8/0258* (2013.01); *H01M 8/0267* (2013.01); *H01M 8/0297* (2013.01); *H01M 8/04007* (2013.01); *H01M 8/10* (2013.01); *H01M 8/244* (2013.01); H01M 8/04201 (2013.01); H01M 2008/1095 (2013.01); Y02E 60/521 (2013.01)

(58) Field of Classification Search
CPC ............. H01M 8/0258; H01M 8/0267; H01M 8/0297; H01M 8/04201
See application file for complete search history.

(56) References Cited

U.S. PATENT DOCUMENTS

| | | | | |
|---|---|---|---|---|
| 3,575,719 A | * | 4/1971 | Nelson | H01M 8/0273 204/246 |
| 6,638,657 B1 | * | 10/2003 | Cisar | C25B 9/04 429/210 |
| 2004/0096716 A1 | * | 5/2004 | Pierpont | F28F 3/12 429/435 |

\* cited by examiner

*Primary Examiner* — Milton I Cano
*Assistant Examiner* — Jennifer A Moss
(74) *Attorney, Agent, or Firm* — Han IP Corporation; Andy M. Han (57) ABSTRACT

Spliced bipolar plates for fuel cells are provided. The spliced bipolar plate includes a supporting plate and a splice plate. The supporting plate has three inlet openings and three outlet openings formed thereon. A plurality of coolant flow channels are provided on one side of the supporting plate, while a recess of a uniform thickness is provided on the opposite side of the supporting plate. One side of the recess is opened to a transverse or a longitudinal side of the supporting plate. The splice plate is divided into a reaction zone part and an extended part by the supporting plate. The size of the reaction zone part is substantially the same as the volume of the recess such that the reaction zone part is received in the recess, connecting the splice plate to the supporting plate. The extended part of the splice plate is projected beyond the supporting plate.

5 Claims, 8 Drawing Sheets

SPLICED BIPOLAR PLATES FOR FUEL CELLS AND FUEL CELL STACKS COMPRISING THE SAME

TECHNICAL FIELD

The present invention relates to fuel cells and, more particularly, relates to spliced bipolar plates for as well as cells and fuel cell stacks comprising such spliced bipolar plates.

BACKGROUND

Fuel cells are devices that can convert chemical energy directly into electrical energy through electrode reaction of hydrogen and oxygen. A fuel cell typically includes multiple fuel cell units. Each fuel cell unit includes two electrodes (anode and cathode) separated from each other by an electrolyte component. The fuel cell units are stacked to be electrically in series to form a fuel cell stack. An electrochemical reaction occurs as appropriate reactants are supplied to each electrode, i.e., fuel is supplied to one electrode and oxidant is supplied to the other electrode, thereby creating an electrical potential difference between the two electrodes. As a result, electrical energy is generated.

In order to supply reactants to each electrode, a particular interfacial component, often referred as "bipolar plate" that is placed on two sides of each individual cell, is used. The bipolar plate is usually in the form of a single component as the supporting body disposed in the vicinity of the anode or cathode. The bipolar plate is a key component of the fuel cell stack. During operation the fuel cell stack, the bipolar plate performs the following functions to ensure an optimal working condition and a long stack lifetime: (1) acting as an electrical conductor between adjacent cells (a cathode and an anode formed on the opposite sides of the bipolar plate electrically connect the single cell in series to form a fuel cell stack); (2) supplying reactant gases (transfer media) to the electrodes through flow channels; (3) facilitating water and heat management and preventing leakage of coolant and reactant gases; and (4) providing structural support for membrane electrode assembly (MEA).

Graphite plates, metal plates and composite plates are the most commonly used bipolar plates. The common problems associated with all these bipolar plates include complex manufacturing process, high cost, and high weight.

A pair of bipolar plates generally sandwich a MEA to form a fuel cell unit, and a fuel cell stack is formed by stacking multiple fuel cell units in series. Thus, the electrical current output of the fuel cell stack is in the series form, i.e., the total voltage $V=V_1+V_2+V_n$. As a result, when one of the fuel cell units in the stack is damaged, the voltage output of the entire stack will be affected.

SUMMARY

To solve the aforementioned problems, the present invention provides low-cost spliced bipolar plates and fuel cell stacks including such spliced bipolar plates such that a constant voltage output can be obtained in the fuel cell stack.

In one aspect, a spliced bipolar plate for fuel cells is provided.

In one embodiment, a spliced bipolar plate of a fuel cell may comprise a supporting plate and a splice plate. The supporting plate may comprise a fuel inlet opening, an oxidant outlet opening, and a coolant outlet opening that are formed along a first end of the supporting plate, a fuel outlet opening, an oxidant inlet opening, and a coolant inlet opening that are formed along a second end of the supporting plate facing the first end, a plurality of coolant flow channels formed on a first side of the supporting plate, and a recess of a substantially uniform depth formed on a second side of the supporting plate opposite to the first side. One side of the recess is opened to a transverse side or a longitudinal side of the supporting plate. The splice plate may be partially disposed on the second side of the supporting plate so as to be divided into a reaction zone part and an extended part by the supporting plate. The reaction zone part may be sized to be substantially the same as a volume of the recess such that the reaction zone part is received in the recess to connect the splice plate with the second side of the supporting plate. The extended part is projected beyond the supporting plate.

The one side of the recess may be opened to the transverse side of the supporting plate. The recess may be connected to the fuel inlet and outlet openings or the oxidant inlet and outlet openings by a flow channel. The flow channel may be connected to a plurality of gas reaction channels on the splice plate.

The one side of the recess may be opened to the longitudinal side of the supporting plate. The splice plate may comprise a fuel outlet opening, an oxidant inlet opening, and a coolant inlet opening that are formed along one end of the splice plate and are configured to correspond to the fuel outlet opening, the oxidant inlet opening, and the coolant inlet opening that are formed along the second end of supporting plate underneath the splice plate, respectively. The fuel inlet opening or the oxidant outlet opening in the supporting plate may be connected to the recess by a flow channel. The fuel outlet opening or the oxidant inlet opening in the splice plate may be connected to the flow channel. The flow channel may be connected to a plurality of gas reaction channels provided on the splice plate.

The flow channel may have a depth less than the depth of the recess.

The extended part of the splice plate may comprise an electrically conductive connector.

The splice plate may be connected to the second side of the supporting plate by adhesive bonding or injection molding.

The splice plate may be made of electrically conductive materials including metals, carbon plates, or conductive composites.

The supporting plate may be made of electrically non-conductive materials including PC or ABS.

In another embodiment, a spliced bipolar plate of a fuel cell may comprise a supporting plate, a first splice plate and a second splice plate. The supporting plate may comprise a fuel inlet opening, an oxidant outlet opening, and a coolant outlet opening that are formed along a first end of the supporting plate, a fuel outlet opening, an oxidant inlet opening, and a coolant inlet opening that are formed along a second end of the supporting plate facing the first end, a first recess of a substantially uniform depth formed on a first side of the supporting plate, and a second recess dimensioned substantially the same as the first recess formed on a corresponding portion of a second side of the supporting plate opposite to the first side. The first recess may include a plurality of downwardly recessed coolant flow channels. One side of each of the first and the second recesses may be opened to a transverse side or a longitudinal side of the supporting plate. The first splice plate may be partially disposed on the first side of the supporting plate so as to be divided into a reaction zone part and an extended part by the supporting plate. The reaction zone part may be sized to be substantially the same as a volume of the first recess such that the reaction zone part is received in the first recess to connect the first splice plate with the first side of the supporting plate. The extended part may be projected beyond the supporting plate. The second splice plate may be partially disposed on the second side of the supporting plate so as to be divided into a reaction zone part and an extended part by the supporting plate. The reaction zone part may be sized to be substantially the same as a volume of the second recess such that the reaction zone part is received in the second recess to connect the second splice plate with the second side of the supporting plate. The extended part may be projected beyond the supporting plate.

The one side of each of the first and the second recesses may be opened to the transverse side of the supporting plate. Each of the first and the second recesses may be connected to the fuel inlet and outlet openings or the oxidant inlet and outlet openings by a flow channel. The flow channel may be connected to a plurality of gas reaction channels on each of the first and the second splice plates.

The first and the second recess may be opened to the longitudinal side of the supporting plate. Each of the first and the second splice plate may comprise a fuel outlet opening, an oxidant inlet opening, and a coolant inlet opening that are formed along one end of each of the first and the second splice plates and are configured to correspond to the fuel outlet opening, the oxidant inlet opening and the coolant inlet opening that are formed along the second end of supporting plate underneath the first and the second splice plates, respectively. The fuel inlet opening or the oxidant outlet opening in the supporting plate may be connected to each of the first and the second recesses by a flow channel. The fuel outlet opening or the oxidant inlet opening in each of the first and the second splice plates may be connected to the flow channel. The flow channel may be connected to a plurality of gas reaction channels on each of the first and the second splice plates.

The flow channel may have a depth less than the respective depth of each of the first and the second recesses.

Each extended part of the first and the second splice plates may comprise an electrically conductive connector.

The first splice plate may be connected to the first side of the supporting plate by adhesive bonding or injection molding. The second splice plate is connected to the second side of the supporting plate by adhesive bonding or injection molding.

The first and the second splices plates may be made of electrically conductive materials including metals, carbon plates, or conductive composites.

The supporting plate is made of electrically non-conductive materials including PC or ABS.

In another aspect, a fuel cell stack that includes spliced bipolar plates of the present invention is provided.

In one embodiment, a fuel cell stack may comprise a plurality of fuel cell unit groups connected in parallel with each of the fuel cell unit groups being connected to a switch and a diode. Each of the fuel cell unit groups comprises a plurality of fuel cell units connected in series. Each of the fuel cell units comprises a membrane electrode assembly (MEA) and a pair of gas diffusion layers (GDLs) sandwiched between two spliced bipolar plates of the present invention.

DETAILED DESCRIPTION OF PREFERRED EMBODIMENTS

The present invention is described below in more detail with reference to the accompanying drawings.

Embodiment 1

Figure 1:
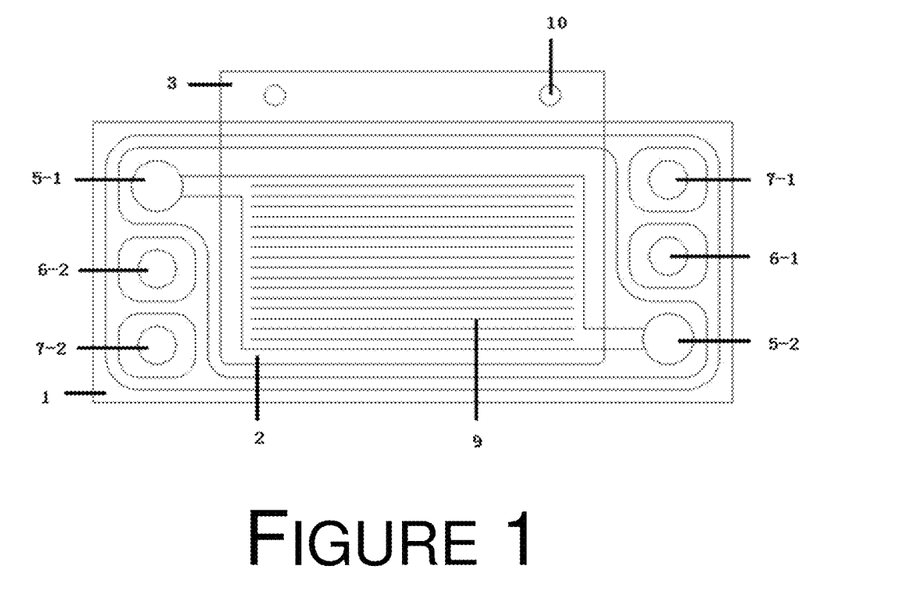
FIG. 1 is a top view of a spliced bipolar plate in accordance with a first embodiment of the present invention.
Figure 2:
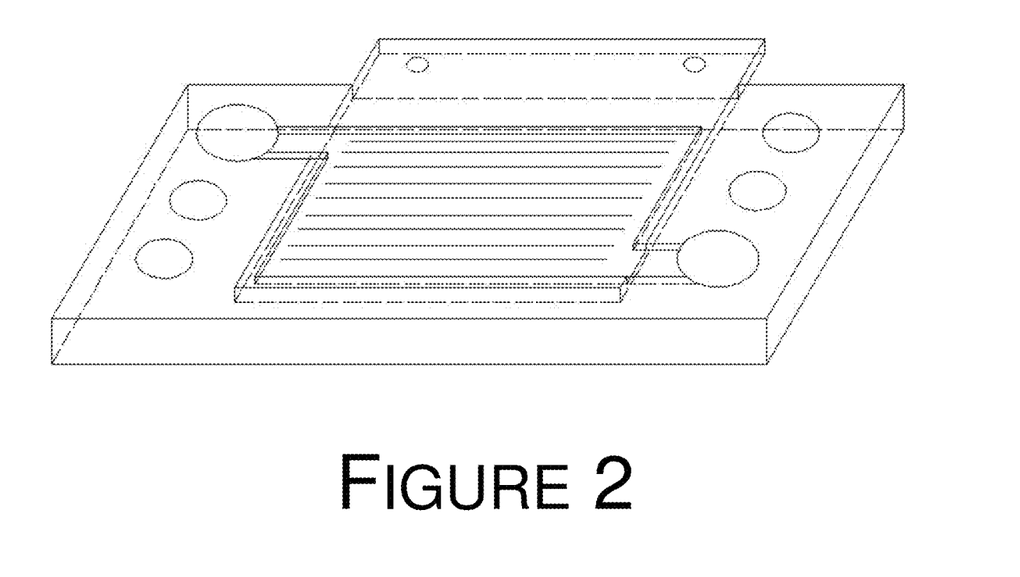
FIG. 2 is a perspective view of a spliced bipolar plate in accordance with the first embodiment of the present invention.
Figure 6:
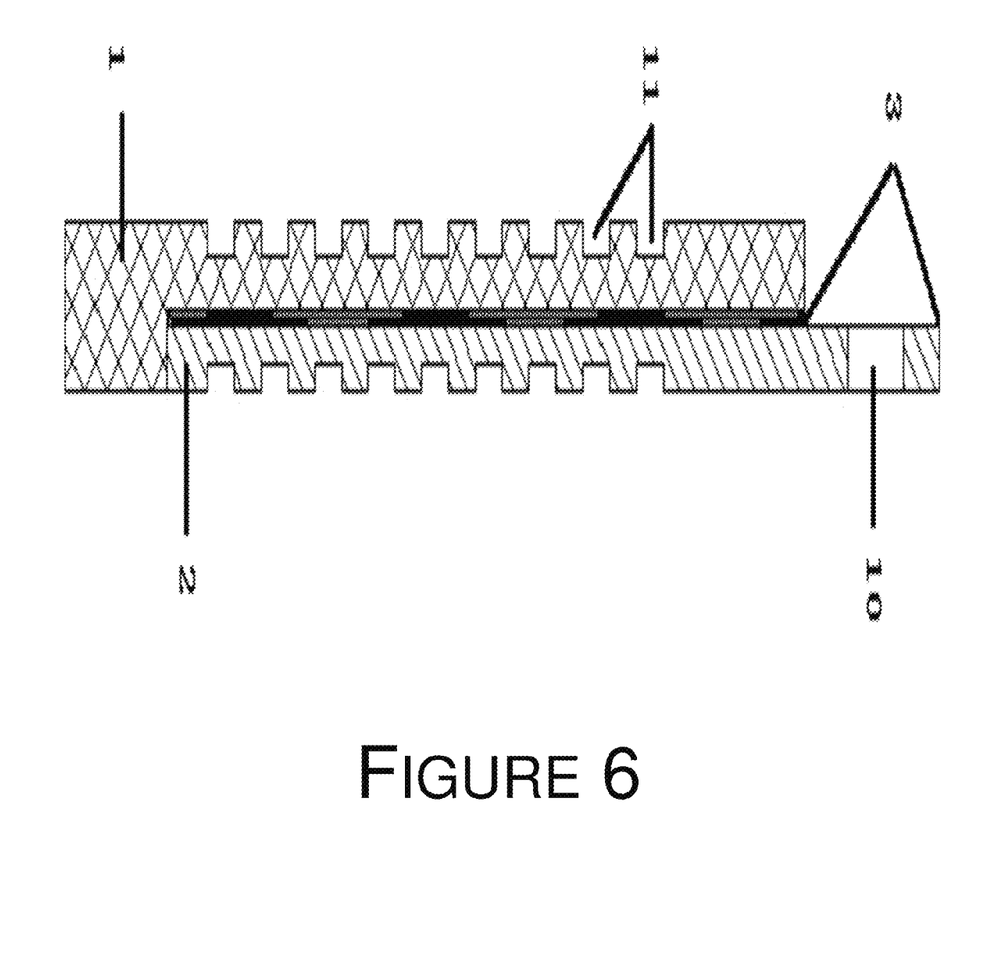
FIG. 6 is a cross-sectional view of a structure of a spliced bipolar plate in accordance with the first embodiment of the present invention.

Referring to FIGS. 1, 2 and 6, a spliced bipolar plate for a fuel cell in accordance with the present invention includes a supporting plate 1 and a splice plate 2. The supporting plate has a rectangular shape with fuel inlet and outlet openings 5-1, 5-2, coolant inlet and outlet openings 6-1, 6-2, and oxidant inlet and outlet openings 7-1, 7-2 formed therein. These openings are formed along two ends of the supporting plate 1. Coolant flow channels 11 are provided on one side of the supporting plate 1, while a rectangular recess 4 of a uniform depth is formed on the opposite side of the supporting plate 1. The splice plate 2 is divided into a two parts, a reaction zone part and an extended part 3. The size of the reaction zone part on the splice plate 2 is the same as the volume of the recess 4. One side of the recess 4 is opened to a transverse side of the supporting plate 1. The splice plate 2 is partially received in the recess 4, thus being connected to the supporting plate 1 at the recess region by injection molded or adhesive bonding. One end of the splice plate 2 extends toward the outside of the supporting plate 1. The fuel inlet and outlet openings 5-1, 5-2 or oxidant inlet and outlet openings 7-1, 7-2 are connected to the recess through a flow channel 8. Gas reaction channels 9 formed on the splice plate 2 are connected to the flow channel 8. The depth of the flow channel 8 is less than that of the recess 4.

The splice plate 2 is made of electrically conductive materials, such as metals, carbon plates, or electrically conductive composites. The supporting plate 1 is made of plastic materials, such as PC or ABS. The supporting plate 1 and the splice plate 2 can be connected to each other by adhesive bonding or injection molding.

Figure 8:
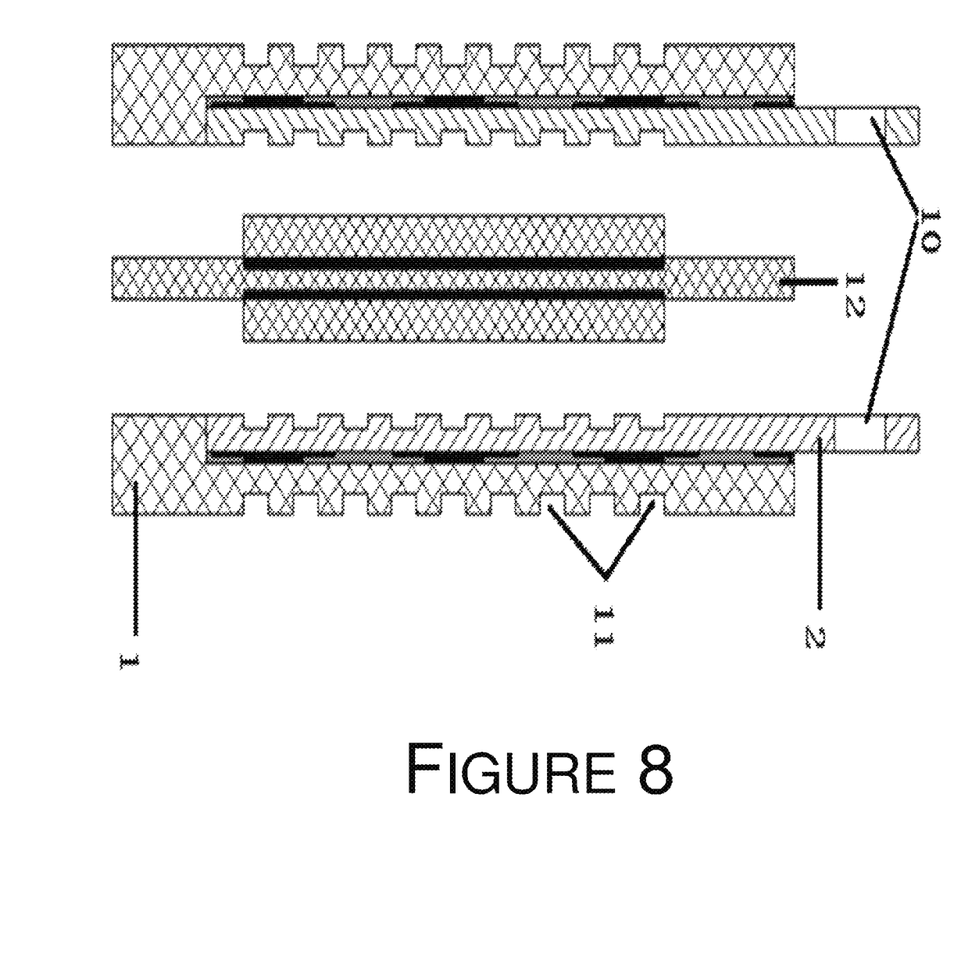
FIG. 8 is a cross-sectional view of a fuel cell unit including a spliced bipolar plate in accordance with the first and the second embodiments of the present invention.
Figure 9:
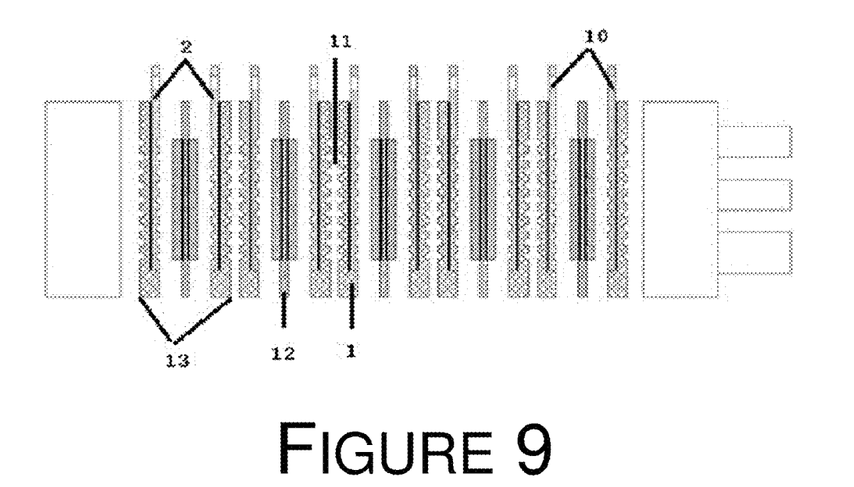
FIG. 9 is a schematic view of a fuel cell stack including a spliced bipolar plate in accordance with the first and the second embodiments of the present invention.

Referring to FIGS. 8 and 9, a fuel cell unit 13 is formed by sandwiching an MEA 12 and gas diffusion layers (GDLs) between two spliced bipolar plates with the sides having the embedded splice plates facing each other. The flow channel 8 connects the fuel inlet opening 5-1 and the fuel outlet opening 5-2 on the anode plate to the gas reaction channels 9 provided on the splice plate 2. The flow channel 8 also connects the oxidant inlet opening 7-1 and the oxidant outlet opening 7-2 on the cathode plate to the gas reaction channels 9 provided on the splice plate 2. A plurality of such fuel cell units 13 are stacked to form a fuel cell stack. A respective one of the coolant flow channels 11 on the cathode plate of one fuel cell unit connects to a corresponding coolant flow channel 11 on the anode plate of the adjacent fuel cell unit, forming a complete coolant flow channel therebetween.

Figure 11:
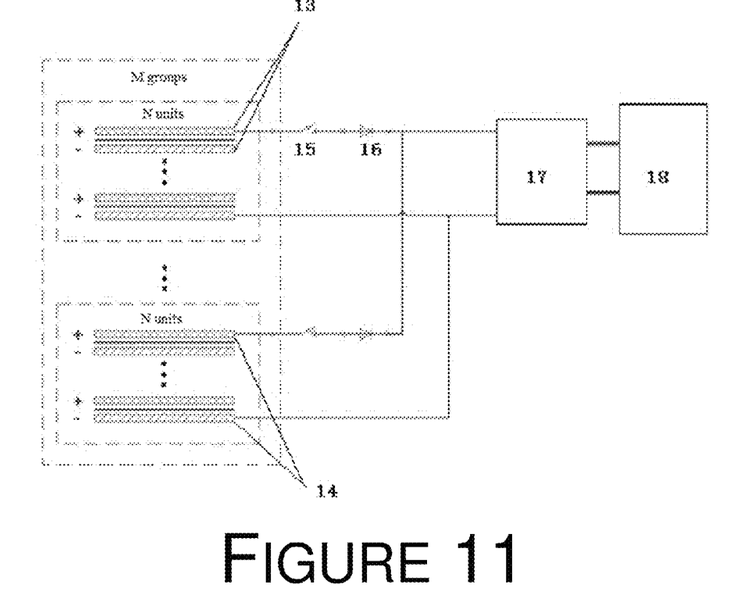
FIG. 11 is a schematic diagram illustrating circuit connection of the fuel cell stack in accordance with the present invention.

Referring to FIG. 11, electrically conductive connectors 10 are provided on the extended part 3 of the splice plate 2 that is projected beyond the supporting plate 1. The electronically conductive connectors 10 of N fuel cell units 13 may be connected in series to constitute a fuel cell unit group 14. After each fuel cell group 14 is connected to a switch 15 and a diode 16, M fuel cell unit groups may be connected in parallel to form a power output for the entire fuel cell stack. After connecting to a power converter 17, the power output circuit is connected to a load 18. The total number of the fuel cell units in the fuel cell stack is S, S=M×N. The specific number of M or N will be determined according to the needs and circumstances of the actual stack, $1 \leq N \leq S$.

Figure 12:
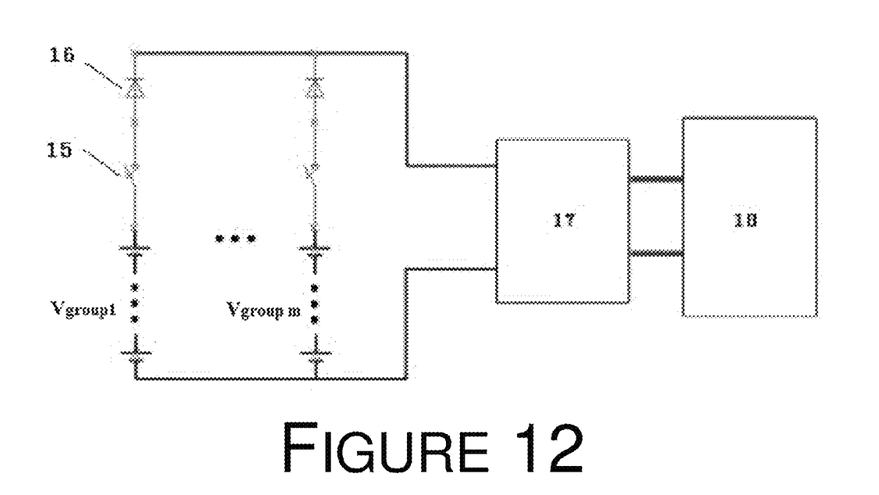
FIG. 12 is a schematic diagram illustrating an equivalent circuit of the fuel cell stack in accordance with the present invention.

According to FIG. 12, the voltage of individual fuel cell unit is $V_1, V_2, \ldots, V_n$, the voltage of individual fuel cell unit group is $V_{g1}, V_{g2}, \ldots, V_{gm}$, and $V_{g1}=V_{g2}=\ldots=V_{gm}=V_1+V_2+\ldots V_n$. The voltage of the entire fuel cell stack is $V_{total}=V_{g1}=V_{g2}=\ldots=V_{gm}$.

If one fuel cell unit is damaged, the switch 15 in the corresponding fuel cell unit group 14 will be opened to disconnect the damaged fuel cell unit group from the stack. Since the fuel cell unit groups are connected in parallel, the total voltage output will not be changed.

Embodiment 2

Figures 3, 4:
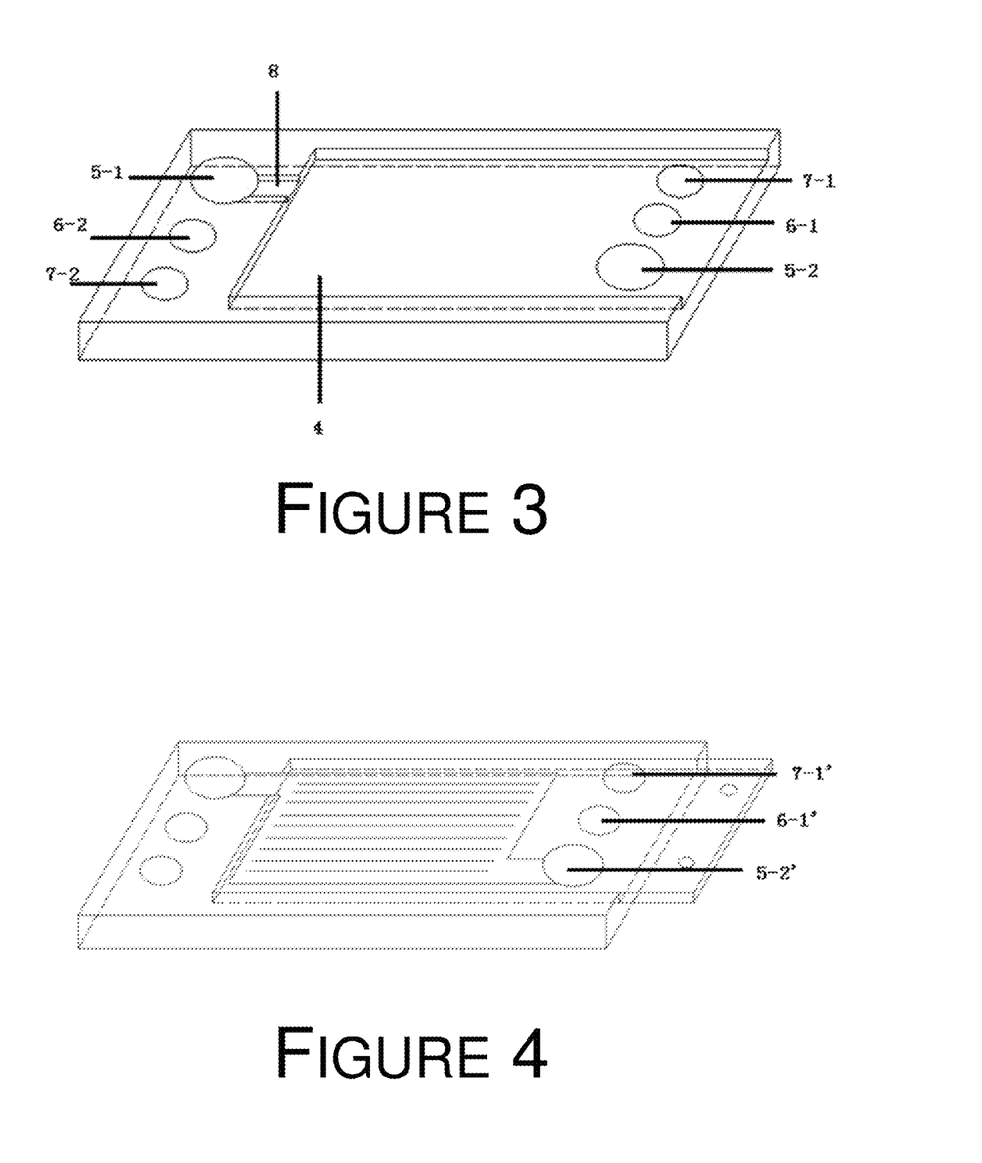
FIG. 3 is a schematic view of a supporting plate in accordance with a second embodiment of the present invention.
FIG. 4 is a schematic view of a spliced bipolar plate in accordance with the second embodiment of the present invention.
Figure 5:
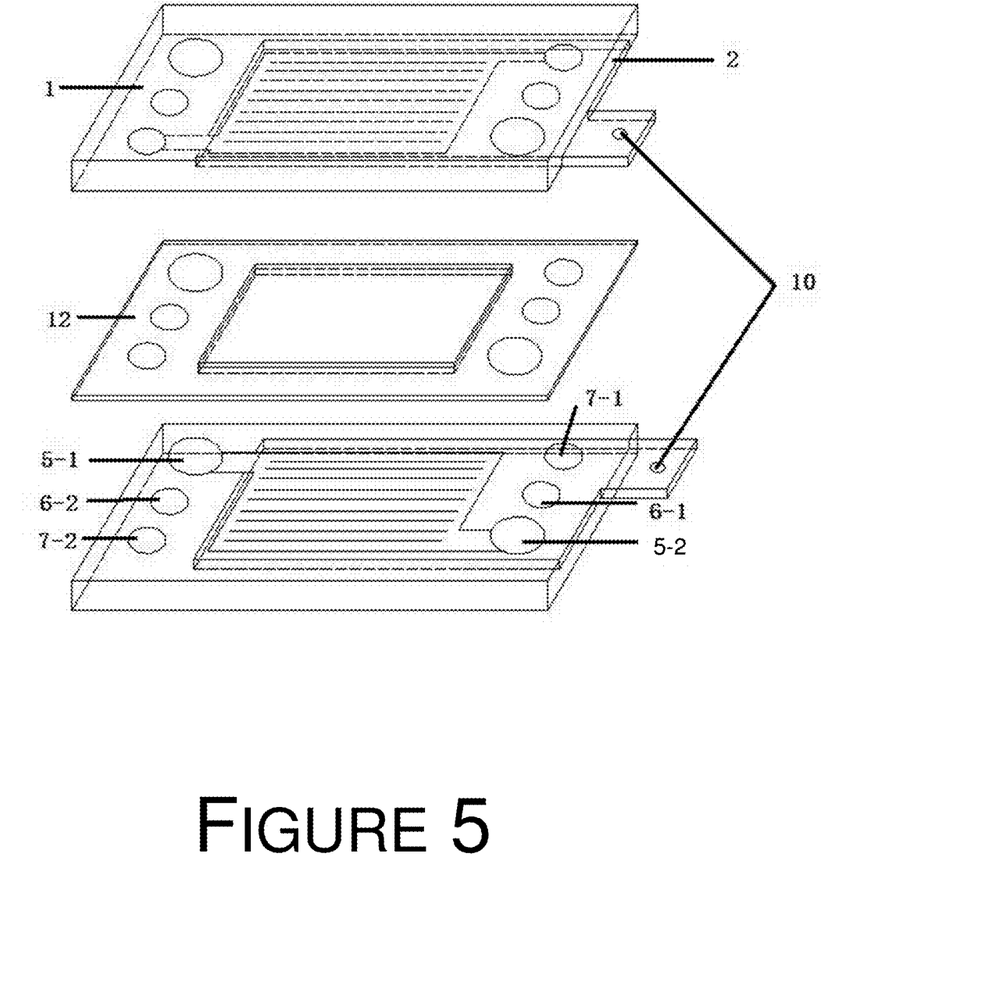
FIG. 5 is an exploded view of a fuel cell unit including a spliced bipolar plate in accordance with the second embodiment of the present invention.

Referring to FIGS. 3 and 4, in Embodiment 2, the respective structure of the splice plate and supporting plate is the same as that in Embodiment 1, the difference lies in that one side of the recess 4 provided on the supporting plate 1 is opened to a longitudinal side of the supporting plate 1. After being received in the recess 4, the splice plate 2 completely covers the fuel outlet opening 5-2, the coolant inlet opening 6-1 and the oxidant inlet opening 7-1 that are formed in one end of the supporting plate. Therefore, a fuel outlet opening 5-2', a coolant inlet opening 6-1', and an oxidant inlet opening 7-1' are formed on the corresponding positions of the splice plate 2, respectively, such that three sets of openings are formed corresponding to each other. The flow channel 8 connects the fuel inlet opening 5-1 or the oxidant outlet opening 7-2 in the supporting plate to the recess 4. The flow channel 8 is connected to the fuel outlet opening 5-2' or the oxidant inlet opening 7-1' in the splice plate, and to the gas reaction flow channels 9 provided on the splice plate. The depth of the flow channel 8 is less than that of the recess 4.

The splice plate is made of electrically conductive materials, such as metals, carbon plates, or conductive composites. The supporting plate is made of plastic materials, such as PC or ABS. The supporting plate and the splice plate can be connected to each other by adhesive bonding or injection molding.

Referring to FIGS. 8 and 9, a fuel cell unit 13 is formed by sandwiching an MEA 12 and GDLs between two spliced bipolar plates with the sides having the embedded splice plates facing each other. The flow channel 8 connects the fuel inlet opening 5-1 and the fuel outlet opening 5-2' in the anode plate to the gas reaction channels 9 provided on the splice plate 2. The flow channel 8 also connects the oxidant inlet opening 7-1' and the oxidant outlet opening 7-2 in the cathode plate to the gas reaction channels 9 provided on the splice plate 2. A plurality of such fuel cell units are stacked to form a fuel cell stack. A respective one of the coolant flow channels 11 on the cathode plate of one fuel cell unit connects to a corresponding coolant flow channel 11 on the anode plate of the adjacent fuel cell unit, forming a complete coolant flow channel therebetween.

The circuit connection of the fuel cell stack is the same as that in Embodiment 1.

Embodiment 3

Figure 7:
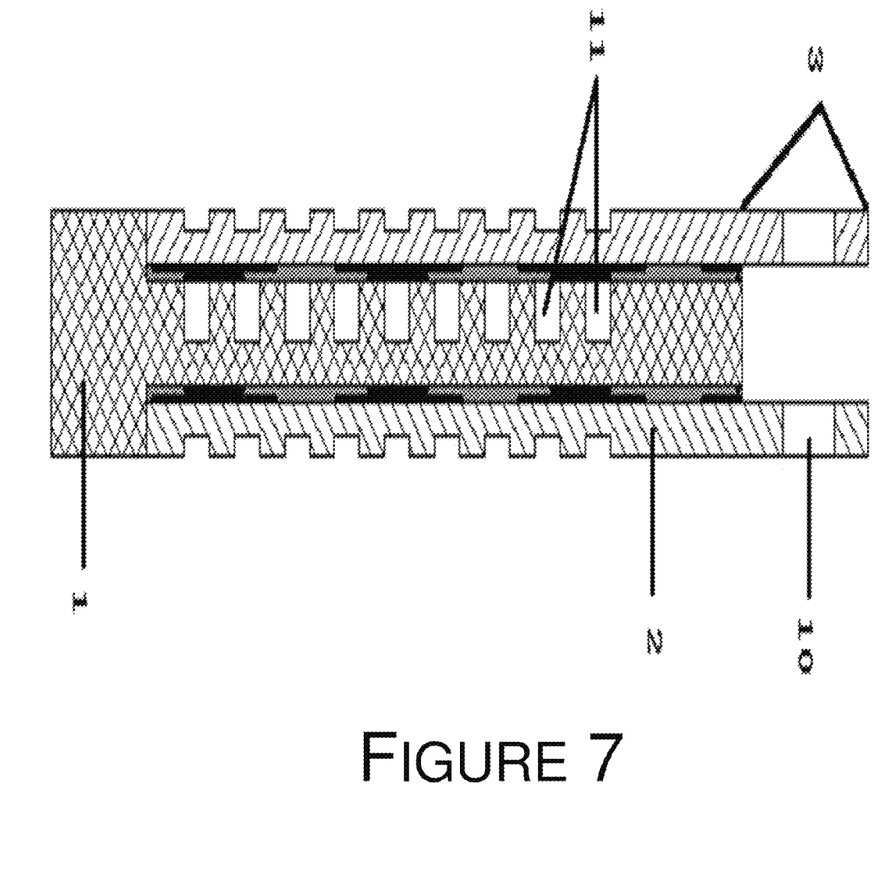
FIG. 7 is a cross-sectional view of a structure of a spliced bipolar plate in accordance with a third embodiment of the present invention.

Referring to FIG. 7, in the present embodiment, the way of forming the spliced bipolar plate is the same as that in Embodiment 1, and the difference lies in the structure of the supporting plate. A spliced bipolar plate of a fuel cell includes a supporting plate 1 and a splice plate 2. Fuel inlet and outlet openings 5-1, 5-2, coolant out inlet and outlet openings 6-1, 6-2, and oxidant inlet and outlet openings 7-1, 7-2 are provided along both ends of the rectangular supporting plate 2. Two rectangular recesses 4 of the same depth are formed on corresponding positions of the opposite sides of the supporting plate 1, respectively. One side of each recess 4 is opened to a transverse side of the supporting plate. For the anode side of the bipolar plate, the flow channel 8 connects the fuel inlet and outlet openings 5-1, 5-2 in the supporting plate to the recesses 4. The flow channel 8 is connected to the gas reaction channels 9 provided on the splice plate 1. For the cathode side of the bipolar plate, the flow channel 8 connects the oxidant inlet and outlet openings 7-1, 7-2 in the supporting plate to the recesses 4. The flow channel 8 is connected to the gas reaction channels 9 provided on the splice plate 1. The depth of the flow channel 8 is less than that of the recesses 4.

The splice plate is made of electrically conductive materials, such as metals, carbon plates, or conductive composites. The supporting plate is made of plastic materials, such as PC or ABS. The supporting plate and the splice plate can be connected to each other by adhesive bonding or injection molding.

Figure 10:
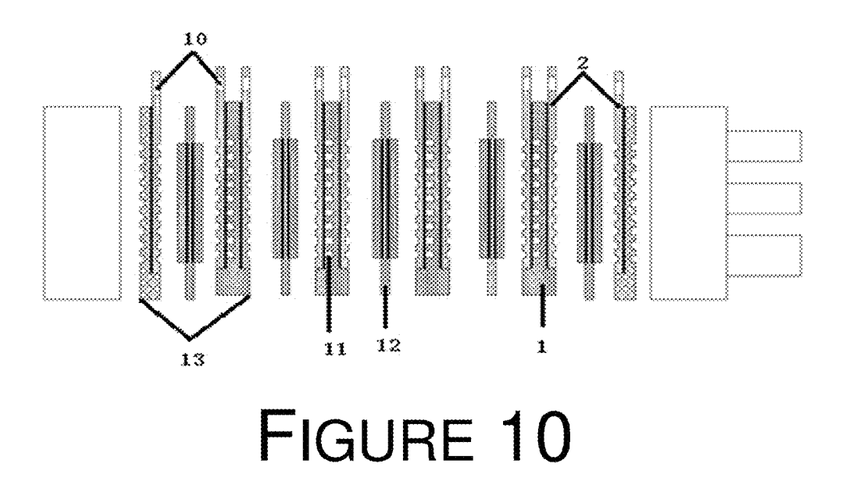
FIG. 10 is a schematic a schematic view of a fuel cell stack including a spliced bipolar plate in accordance with the third and a fourth embodiments of the present invention.

Referring to FIG. 10, a fuel cell unit 13 is formed by sandwiching an MEA 12 and GDLs between two spliced bipolar plates with the sides having the embedded splice plates facing each other. A plurality of fuel cell units are stacked to form a fuel cell stack. The spliced bipolar plate with a supporting plate having a structure the same as that in Embodiment 1 is used as the first and the last bipolar plates in the fuel cell stack.

The circuit connection of the fuel cell stack is the same as that in Embodiment 1.

Embodiment 4

In the present embodiment, the way of forming the spliced bipolar plate is the same as that in Embodiment 2, but the structure of the supporting plate is the same as that in Embodiment 3.

Referring to FIG. 10, a fuel cell unit 13 is formed by sandwiching an MEA 12 and GDLs between two spliced bipolar plates with the sides having the embedded splice plates facing each other. A plurality of such fuel cell units are stacked to form a fuel cell stack. The spliced bipolar plate with a supporting plate having a structure the same as that in Embodiment 1 is used as the first and the last bipolar plates in the fuel cell stack.

The circuit connection of the fuel cell stack is the same as that in Embodiment 1.

One advantage of the present invention is that, the entire fuel stack can be formed either by fist connecting the fuel cell units in series to form m fuel cell unit groups and then connecting m fuel cell unit groups in parallel (the total voltage $V=V_1=V_2= \ldots V_m$) or by connecting N fuel cell units in parallel (the total voltage $V=V_1=V_2= \ldots V_n$). Each fuel cell group is connected to a switch and a diode. Any damage to a fuel cell unit will open the switch of the corresponding fuel cell unit group, disconnecting the fuel cell unit group from the fuel cell stack. Since the stack output is formed by connecting the fuel cell unit groups in parallel, the damaged cell unit will not affect the voltage output of the entire stack. As a result, the reliability and durability of the fuel cell stack are greatly improved.

The supporting plate of the present invention is made of non-conductive materials such as plastics. The plastic materials, when viewed from either material cost or processing (e.g., injection molding), are less expensive than the conventional bipolar plate materials, such as graphite, metals, or composite panels. Therefore, the bipolar plates of the present invention can significantly reduce the manufacturing cost.

What is claimed is:

1. A spliced bipolar plate of a fuel cell, comprising:
    a supporting plate comprising:
        a fuel inlet opening, an oxidant outlet opening, and a coolant outlet opening that are formed along a first end of the supporting plate;
        a fuel outlet opening, an oxidant inlet opening, and a coolant inlet opening that are formed along a second end of the supporting plate facing the first end;
        a first recess of a substantially uniform first depth formed on a first side of the supporting plate, wherein the first recess includes a plurality of downwardly recessed coolant flow channels; and
        a second recess of a substantially uniform second depth, the second recess dimensioned substantially the same as the first recess formed on a corresponding portion of a second side of the supporting plate opposite to the first side,
        wherein one side of each of the first and the second recesses is completely opened to a transverse side or a longitudinal side of the supporting plate;
    a first splice plate partially disposed on the first side of the supporting plate so as to be divided into a reaction zone part and an extended part by the supporting plate,
        wherein the reaction zone part is sized to be substantially the same as a volume of the first recess such that the reaction zone part is received in the first recess to connect the first splice plate with the first side of the supporting plate, and
        wherein the extended part is projected beyond the supporting plate; and
    a second splice plate partially disposed on the second side of the supporting plate so as to be divided into a reaction zone part and an extended part by the supporting plate,
        wherein the reaction zone part is sized to be substantially the same as a volume of the second recess such that the reaction zone part is received in the second recess to connect the second splice plate with the second side of the supporting plate, and
        wherein the extended part is projected beyond the supporting plate,
    wherein the extended part of the first splice plate and the extended part of the second splice plate each respectively comprises an electrically conductive connector, and wherein the spliced bipolar plate of the fuel cell is configured to electrically couple to one or more other spliced bipolar plates of the fuel cell via the electrically conductive connectors of the extended part of the first splice plate and the extended part of the second splice plate to form a serial electrical connection, a parallel electrical connection, or a combination thereof, between the spliced bipolar plate and the one or more other spliced bipolar plates of the fuel cell, and wherein each of the first and second recesses is connected to the fuel inlet and outlet openings or the oxidant inlet and outlet openings, respectively, by a reactant flow channel having a depth less than the respective first or second depth.

2. The spliced bipolar plate of a fuel cell of claim 1, wherein the one side of each of the first and the second recesses is completely opened to the transverse side of the supporting plate, and wherein the reactant flow channel is connected to a plurality of gas reaction channels on each of the first and the second splice plates.

3. The spliced bipolar plate of a fuel cell of claim 1, wherein the first splice plate is connected to the first side of the supporting plate by adhesive bonding or injection molding, and wherein the second splice plate is connected to the second side of the supporting plate by adhesive bonding or injection molding.

4. The spliced bipolar plate of a fuel cell of claim 1, wherein the first and the second splices plates are made of electrically conductive materials including metals, carbon plates, or conductive composites.

5. The spliced bipolar plate of a fuel cell of claim 1, wherein the supporting plate is made of electrically non-conductive materials including PC or ABS.

* * * * *